(12) United States Patent
Fujita et al.

(10) Patent No.: US 10,766,389 B2
(45) Date of Patent: Sep. 8, 2020

(54) VEHICLE SEAT

(71) Applicants: DELTA KOGYO CO., LTD., Aki-gun (JP); DELTA TOOLING CO., LTD., Hiroshima-shi (JP)

(72) Inventors: Etsunori Fujita, Higashihiroshima (JP); Yumi Ogura, Higashihiroshima (JP); Eiji Sugimoto, Higashihiroshima (JP); Minoru Nakamura, Hiroshima (JP); Ryuji Kuwano, Hiroshima (JP)

(73) Assignees: DELTA KOGYO CO., LTD., Aki-gun (JP); DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 16/336,227

(22) PCT Filed: Sep. 20, 2017

(86) PCT No.: PCT/JP2017/033988
§ 371 (c)(1),
(2) Date: Mar. 25, 2019

(87) PCT Pub. No.: WO2018/056334
PCT Pub. Date: Mar. 29, 2018

(65) Prior Publication Data
US 2020/0023760 A1    Jan. 23, 2020

(30) Foreign Application Priority Data

Sep. 26, 2016    (JP) .................... 2016-187638

(51) Int. Cl.
*B60N 2/68*    (2006.01)
*B60N 2/70*    (2006.01)

(52) U.S. Cl.
CPC ............. *B60N 2/7094* (2013.01); *B60N 2/68* (2013.01)

(58) Field of Classification Search
CPC . B60N 2/68; B60N 2/64; B60N 2/646; B60N 2/70; B60N 2/7094; B60N 2/72; B60N 2/0284; B60N 2/2821
See application file for complete search history.

(56) References Cited

U.S. PATENT DOCUMENTS 4,805,953 A * 2/1989 Yamauchi ............ B60N 2/3013
                                                              296/65.09
6,854,805 B2 * 2/2005 Fujita .................. B60N 2/7094
                                                              297/452.56
(Continued)

FOREIGN PATENT DOCUMENTS

EP    1 177 935 A2    2/2002
EP    1 177 935 A3    2/2002
(Continued)

OTHER PUBLICATIONS

Extended European Search Report dated Oct. 16, 2019 in U.S. Appl. No. 17/853,104.2, 5 pages.
(Continued)

*Primary Examiner* — Shin H Kim
(74) *Attorney, Agent, or Firm* — Oblon, McClelland, Maier & Neustadt, L.L.P.

(57) ABSTRACT

A seat cushion part includes a base fabric extending between and looped around a front edge frame and a rear edge frame, and having an upper layer part and a lower layer part which are provided apart from each other in an up-down direction. Wire members of metal are provided respectively on side edge portions of the base fabric, and coil springs are spring members each extending between an end portion of the wire member and the front edge frame or the rear edge frame. A load further applied due to vibration, impact, and so on causes the upper layer part to come into contact with the lower layer part to also displace the lower layer part in the (Continued)

up-down direction. Consequently, the coil springs connected through the wire members extend/contract, and their elastic force acts.

6 Claims, 8 Drawing Sheets

(56) References Cited

U.S. PATENT DOCUMENTS

| | | | | |
|---|---|---|---|---|
| 2002/0033630 A1* | 3/2002 | Takata | ................ | B60N 2/7011 297/452.56 |
| 2003/0193231 A1* | 10/2003 | Fujita | ................ | B60N 2/7094 297/452.56 |
| 2007/0013217 A1* | 1/2007 | Fujita | ................ | B60N 2/42736 297/284.4 |
| 2013/0033080 A1* | 2/2013 | Sei | ................ | B60N 2/7005 297/353 |
| 2016/0114711 A1* | 4/2016 | Takahashi | ................ | B60N 2/70 297/452.59 |

FOREIGN PATENT DOCUMENTS

| | | |
|---|---|---|
| EP | 1 348 357 A2 | 10/2003 |
| EP | 1 348 357 A3 | 10/2003 |
| JP | 54-143706 | 3/1978 |
| JP | 58-82162 U | 6/1983 |
| JP | 63-155737 U | 10/1988 |
| JP | 2001-341565 A | 12/2001 |
| JP | 2011-46266 A | 3/2011 |
| JP | 2014-108741 A | 6/2014 |

OTHER PUBLICATIONS

International Search Report dated Dec. 19, 2017 in PCT/JP2017/033988 filed Sep. 20, 2017.

\* cited by examiner

VEHICLE SEAT

TECHNICAL FIELD

The present invention relates to a seat for vehicles such as automobiles, in particular, to a vehicle seat suitable as a rear seat.

BACKGROUND ART

Patent Document 1 discloses a vehicle seat suitable as a rear seat. In this vehicle seat, plate members made of hard synthetic resin are disposed on a front edge frame of a seat cushion part via leaf springs, and a seat cushion pad made of urethane is disposed on upper portions of the plate members. Since rear edge portions of the plate members are not fixed and only their front edge portions are supported by the aforesaid leaf springs, the rear edge portion sides are elastically biased so as to be displaced in an up-down direction around the front edge portions.

PRIOR ART DOCUMENT

Patent Document

Patent Document 1: Japanese Patent Application Laid-open No. 2014-108741

SUMMARY OF THE INVENTION

Problems to be Solved by the Invention

In the vehicle seat described in Patent Document 1, vibration absorbency is improved using elastic force by adopting the cantilever structure in which the plate members are supported only on the front edge frame via the leaf springs as described above. Further, since the plate members are made of the synthetic resin harder than the seat cushion pad, load concentration is prevented, resulting also in excellent body pressure dispersibility. However, giving importance to the use of an elastic action, this structure still has room for improvement in a damping characteristic.

The present invention was made in consideration of the above, and has an object to provide a vehicle seat that can contribute to a further improvement in vibration absorbency and shock absorbency and so on represented by the vibration absorbency, by the balanced functioning of an elastic action and a damping characteristic function.

Means for Solving the Problems

In order to solve the aforesaid problem, the vehicle seat of the present invention is a vehicle seat which includes a seat cushion part and a seat back part, the seat cushion part including:
a cushion frame including a front edge frame and a rear edge frame which are arranged a predetermined interval apart from each other in a front-rear direction and a pair of side frames each disposed between opposed longitudinal-direction end portions of the front edge frame and the rear edge frame;
a base fabric extending between and looped around the front edge frame and the rear edge frame, and having an upper layer part and a lower layer part which are provided apart from each other in an up-down direction;
wire members of metal extending in the front-rear direction respectively on side edge portions of the lower layer part of the base fabric; and
spring members extending between the front edge frame and front end portions of the wire members and between the rear edge frame and rear end portions of the wire members.

Preferably, the wire members are hard-drawn steel wires or spring steel wires. Preferably, the spring members are coil springs.

Preferably, the vehicle seat includes a vehicle body attachment bracket projecting rearward from the rear edge frame of the cushion frame, and force acting on the front edge frame is transmitted to the vehicle body attachment bracket through the pair of side frames.

Preferably, the seat back part includes a back frame coupled by the vehicle body attachment bracket, the back frame includes: an outer frame in a substantially quadrangular shape; a trunk support plate extending in the up-down direction in the outer frame and supporting the back of a seated person; and an intersecting frame extending in a vehicle width direction so as to intersect with the trunk support plate and fixed to the trunk support plate at an intersection portion, and the trunk support plate and the intersecting frame are transmission paths of force toward the cushion frame.

The vehicle seat of the present invention is suitable especially as a rear seat.

Effect of the Invention

According to the vehicle seat of the present invention, the seat cushion part includes the base fabric extending between and looped around the front edge frame and the rear edge frame, and having the upper layer part and the lower layer part which are provided apart from each other in the up-down direction, the metal wire members are provided along the side edge portions of the lower layer part of the base fabric, and the spring members each extend between the end portion of the wire member and the front edge frame or the rear edge frame Therefore, when given a load, the upper layer part of the base fabric which is only looped around the front edge frame and the rear edge frame is displaced downward to damp the force. When given a further load due to vibration, shock, and so on, the upper layer part comes into contact with the lower layer part to also displace the lower layer part in the up-down direction. Consequently, the spring members connected through the wire members extend/contract and their elastic force acts. Therefore, the present invention enables the balanced functioning of the damping characteristic accompanying the displacement of the upper layer part of the base fabric and the elastic action of the spring members accompanying the displacement of the lower layer part. In addition, since each pair of the front and rear spring members engaged with the base fabric is in series connection through the metal wire member, the spring constant of the spring members reduces, enabling an increase in a damping ratio of the base fabric. Therefore, the vehicle seat of the present invention can exhibit high damping force and can contribute to a further improvement in vibration absorbency and shock absorbency in spite of being thin. Adopting the hard-drawn steel wires as the wire members makes it possible to effectively bring out the elastic force of the front and rear spring members coupled to the wire members. Adopting the spring steel wires makes it possible to further increase the vibration absorbency and the shock absorbency because the elastic force of the spring steel wires themselves also functions. Further, the metal wire members disposed along the side portions of the base fabric makes body pressure dispersibility excellent.

MODES FOR CARRYING OUT THE INVENTION

Figure 1:
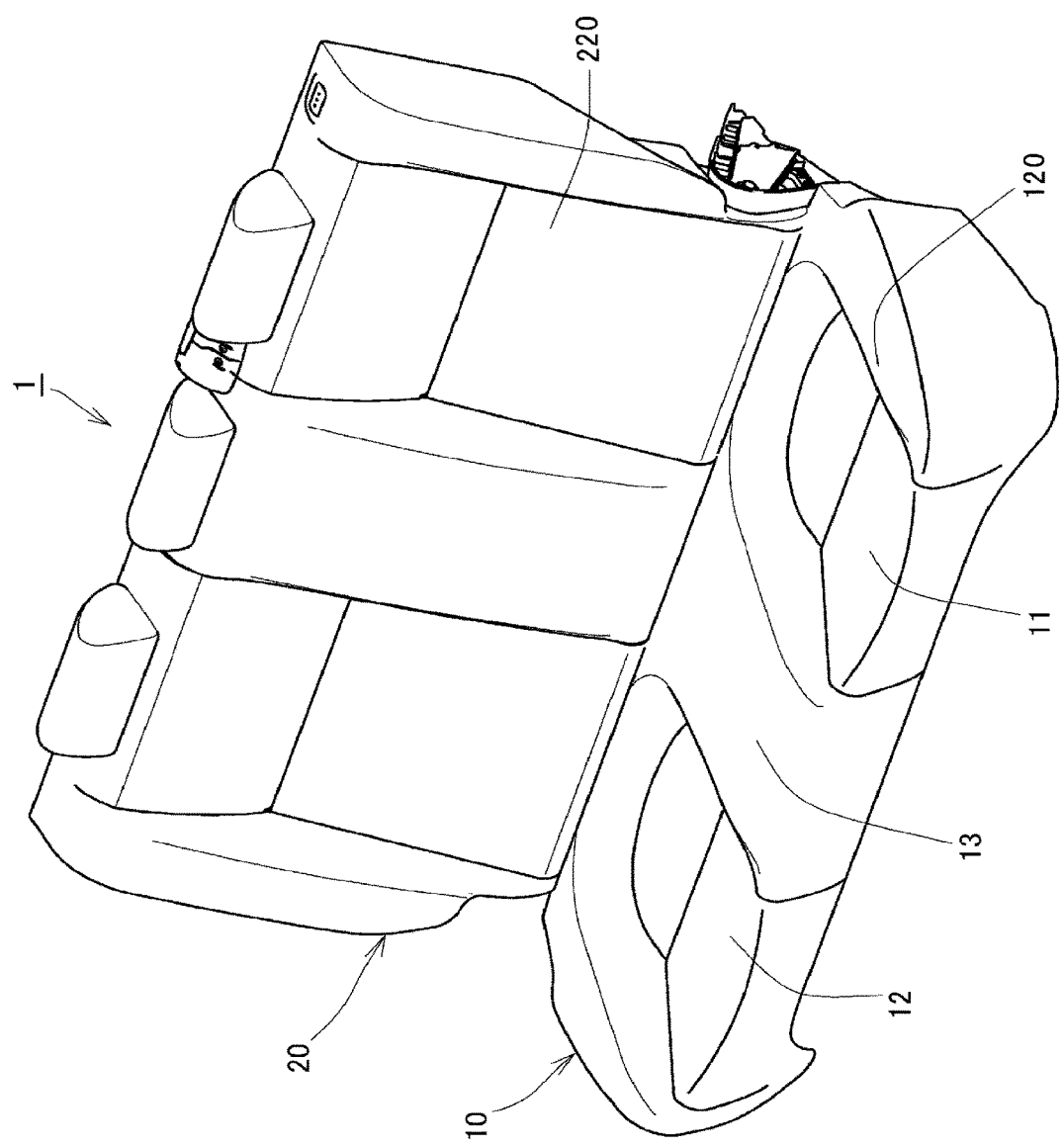
FIG. 1 is an external perspective view illustrating a rear seat according to one embodiment of the present invention.

The present invention will be hereinafter described in more detail based on an embodiment illustrated in the drawings. FIG. 1 to FIG. 8 illustrate an example where the configuration of the vehicle seat of the present invention is applied to a rear seat 1. As illustrated in FIG. 1, the rear seat 1 includes a seat cushion part 10 and a seat back part 20. In this embodiment, the seat cushion part 10 has two side seat parts 11, 12 which are a predetermined interval apart from each other in a vehicle width direction and a center seat part 13 therebetween.

Figure 8:
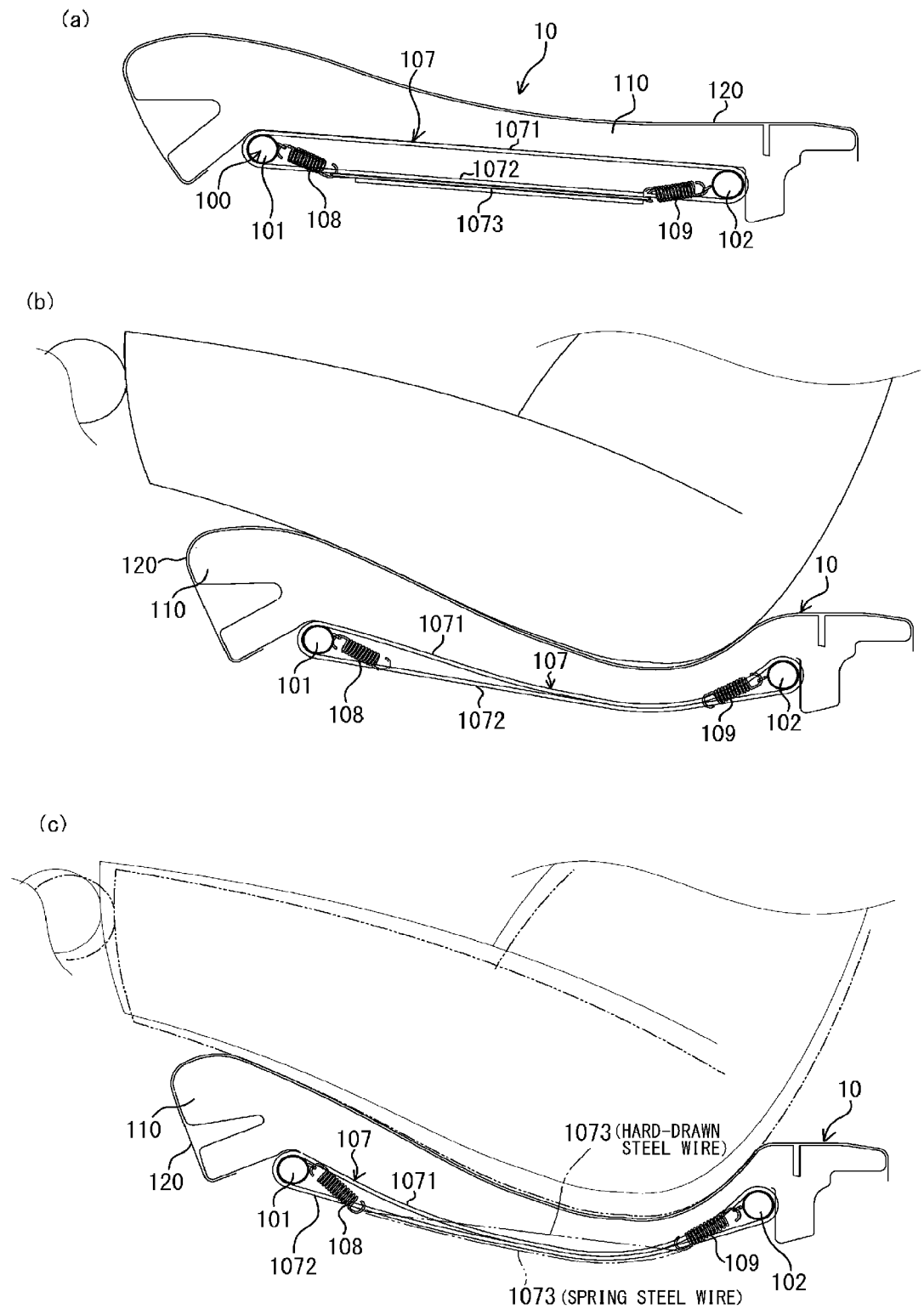
FIG. 8 are explanatory views of the operation of the above embodiment, FIG. 8(a) being a view illustrating a no-load state, FIG. 8(b) being a view illustrating a seated state, and FIG. 8(c) being a view illustrating a state when vibration is input.

The seat cushion part 10 includes a cushion frame 100, a seat cushion pad 110, and a seat cushion cover member 120 (refer to FIG. 8). The cushion frame 100 includes: a front edge frame 101 and a rear edge frame 102 which extend in the vehicle width direction and are disposed a predetermined interval apart from each other in a front-rear direction; and a pair of side frames 103, 104 which are each disposed between opposed end portions of the front edge frame 101 and the rear edge frame 102 (refer to FIG. 2 to FIG. 5 and so on). Three vehicle body attachment brackets 105 projecting rearward are provided on the rear edge frame 102 at appropriate intervals, and the vehicle body attachment brackets 105 are fixed at predetermined positions of the vehicle body with bolts.

As described above, in this embodiment, the cushion frame 100 of the seat cushion part 10 has the front edge frame 101, the rear edge frame 102, and the side frames 103, 104 extending between the front edge frame 101 and the rear edge frame 102, and is formed in a substantially quadrangular shape in a plane view. Accordingly, a large impact applied in the front-rear direction is transmitted from the front edge frame 101 to the rear edge frame 102 through the side frames 103, 104, and is further transmitted to the vehicle body through the vehicle body attachment brackets 105. This structure eliminates a need for the fixation on the front edge side at a plurality of places as is done in conventional rear seats, and only the fixation at one place near the middle of the front edge frame 101 is enough in order to obtain sufficient strength. Further, even if the seat cushion pad 110 is thinner than conventional ones, impact energy is efficiently dispersed.

Between the front edge frame 101 and the rear edge frame 102, four wires 106 which are arranged in the vehicle width direction extend substantially in parallel to the side frames 103, 104. Specifically, two of the wires 106, 106 are disposed right on inner sides of the side frames 103, 104 respectively, and between the two wires 106, 106, the other two wires 106, 106 are arranged in the vehicle width direction at substantially equal intervals, and positions between the adjacent wires 106, 106 correspond to the aforesaid side seat parts 11, 12 and center seat part 13. Incidentally, these wires 106 are used to support the seat cushion cover member 120 in a suspended manner.

In each space between the adjacent wires 106, 106, a base fabric 107 is disposed. That is, the three base fabrics 107 are provided at the aforesaid positions corresponding to the side seat parts 11, 12 and the center seat part 13. The base fabrics 107 each extend in the front-rear direction between and looped around the front edge frame 101 and the rear edge frame 102. Accordingly, the base fabrics 107 each have an upper layer part 1071 and a lower layer part 1072 whose vertical interval corresponds to the diameter of the front edge frame 101 and the rear edge frame 102 (refer to FIG. 8(a)). Being fixed at predetermined positions, the front edge frame 101 and the rear edge frame 102 themselves are not displaced, and the base fabrics 107 are only looped around the fixed front edge frame 101 and rear edge frame 102 and are not strongly tensed in the looped stated. Therefore, when a downward load is applied to the base fabrics 107, the upper layer parts 1071 act to damp force ascribable to the load by being displaced downward while receiving the force until coining into contact with the lower layer parts 1072.

The base fabrics 107 preferably extend between the front edge frame 101 and the rear edge frame 102 with an elongation percentage of 5% or less, more preferably with an elongation percentage of 0%, in order to achieve such a function. More preferably, the base fabrics 107 extend with a slight slack.

On side edge portions 1072a, 1072a of the lower layer part 1072 of each of the base fabrics 107, wire members 1073, 1073 made of metal extend in the front-rear direction. Their installation method may be any and can be, for example, to form the side edge portions 1072a, 1072a in a cylindrical shape and insert the wire members 1073, 1073 into the side edge portions 1072a, 1072a. Note that the front-rear-direction length of the cylindrical side edge portions 1072a, 1072a is shorter than the front-rear-direction length of the widthwise center portions of the base fabrics 107, and the side edge portions 1072a, 1072a are in contact with neither the front edge frame 101 nor the rear edge frame 102. Therefore, when the wire members 1073, 1073 are inserted into the cylindrical side edge portions 1072a, 1072a, their front end portions 1073a and rear end portions 1073b project from front-rear-direction end portions of the cylindrical side edge portions 1072a, 1072a (refer to FIG. 5(a)).

The wire members 1073, 1073 are coupled to spring members. Preferably, coil springs 108, 109 are used as the spring members as in this embodiment. Specifically, the front coil springs 108 are suspended by their hooks being engaged with engagement portions 101a welded to the front edge frame 101 and with the front end portions 1073a of the wire members 1073, and the rear coil springs 109 are suspended by their hooks being engaged with engagement portions 102a welded to the rear edge frame 102 and with the rear end portions 1073b of the wire members 1073.

Incidentally, the engagement portions 101a on the front edge frame 101 and the engagement portions 102a on the rear edge frame 102 are all located near extensions of the side edge portions 1072a, 1072a of the base fabrics 107. Consequently, the corresponding front coil spring 108, wire member 1073, and rear coil spring 109 are disposed substantially on a straight line, or even if the coil springs 108, 109 are postured slightly inclined with respect to the arrangement direction of the wire member 1073, they extend along the front-rear direction as a whole. Therefore, each pair of the coil springs 108, 109 is in series connection through the wire member 1073, so that a spring constant reduces. The reduction in the spring constant results in a structure having a high damping ratio to the vibration input to the base fabrics 107 supported by the coil springs 108, 109 and the wire members 1073. Consequently, the base fabrics 107 can exhibit a high damping characteristic even though their up-down stroke is small.

As the wire members 1073, steel wires are preferably used. In particular, the use of hard-drawn steel wires or spring steel wires is more preferable. Being high in rigidity, the hard-drawn steel wires are substantially linear even when the vibration is input while a person is seated as indicated by the imaginary line in FIG. 8(c) and act to bring out the elasticity of the front and rear coil springs 108, 109 sufficiently. The spring steel wires deflect according to the up-down displacement as indicated by the imaginary line in FIG. 8(c) and accordingly the elasticity of the spring steel wires themselves further act and they each constitute part of the series-connection spring element together with the front and rear coil springs 108, 109, making it possible to further increase the damping ratio. Whether to use the hard steel wires or the spring steel wires can be selected according to the required feeling of seating and performance.

Further, since the wire members 1073, 1073 are provided on the side edge portions 1072a, 1072a in the base fabrics 107, they can also function to reduce load concentration and increase body pressure dispersibility. In this case, the use of the hard-drawn steel wires leads to increased rigidity, which is more preferable in terms of the body pressure dispersibility.

Here, as the base fabrics 107, two-dimensional fabrics (including any of types such as woven fabrics, nonwoven fabrics, knitted fabrics, and nets) are usable, but the use of three-dimensional fabrics (including any of types such as woven fabrics, nonwoven fabrics, knitted fabrics, and nets) is preferable because the thickness-direction friction between their yarns or fibers can produce higher damping force. In particular, the use of three-dimensional knitted fabrics in which connecting yarns are repeatedly knitted to/from a pair of ground knitted fabrics is more preferable because friction force between their adjacent connecting yarns easily acts.

On upper portions of the base fabrics 107 provided in the above-described manner, seat cushion pads 110 made of urethane or the like are disposed with their front and rear portions being supported by the front edge frame 101 and the rear edge frame 102 respectively. Their surfaces are covered with the seat cushion cover member 120 (refer to FIG. 8).

Figure 2:
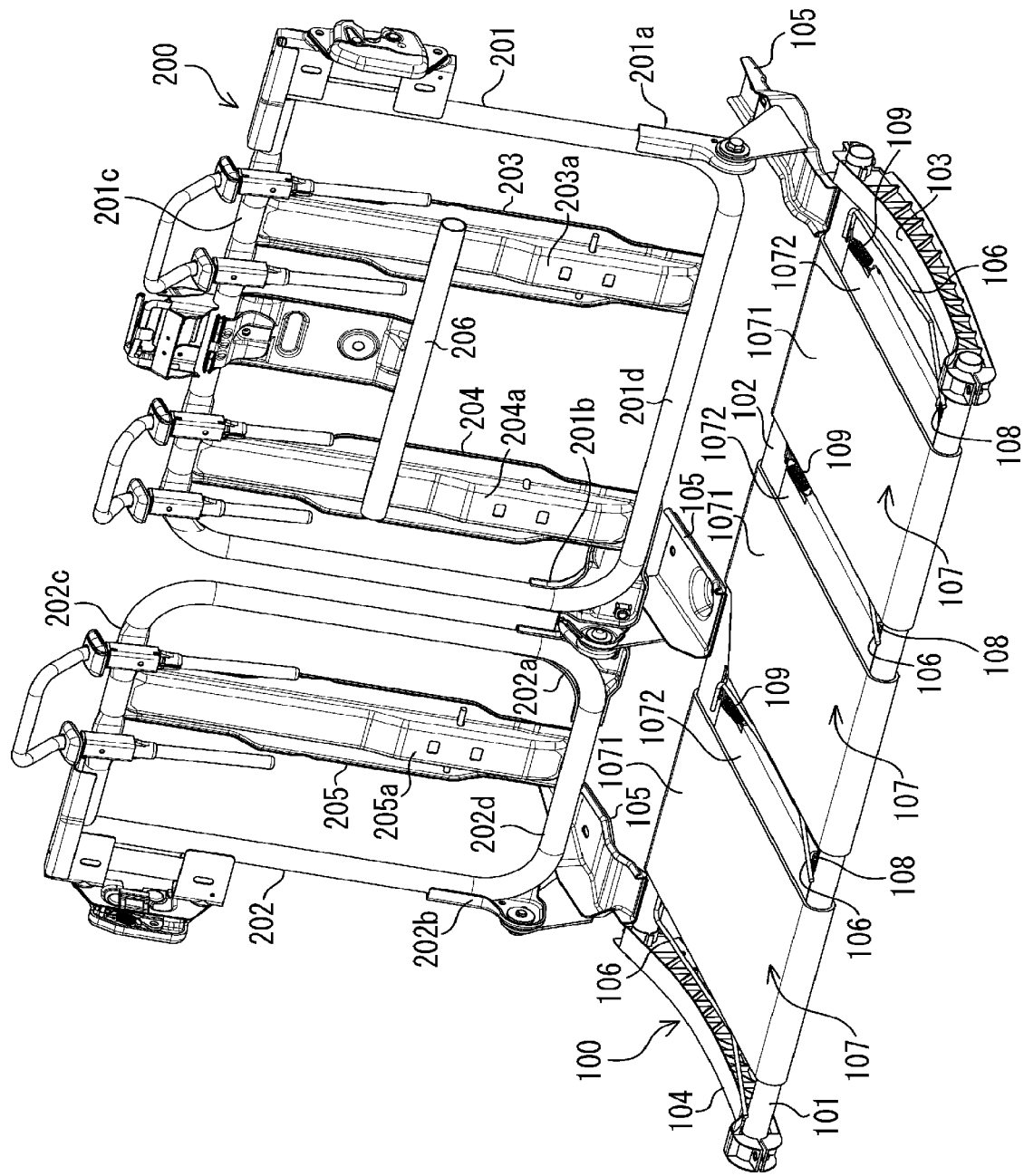
FIG. 2 is a perspective view illustrating a cushion frame and a back frame.
Figure 3:
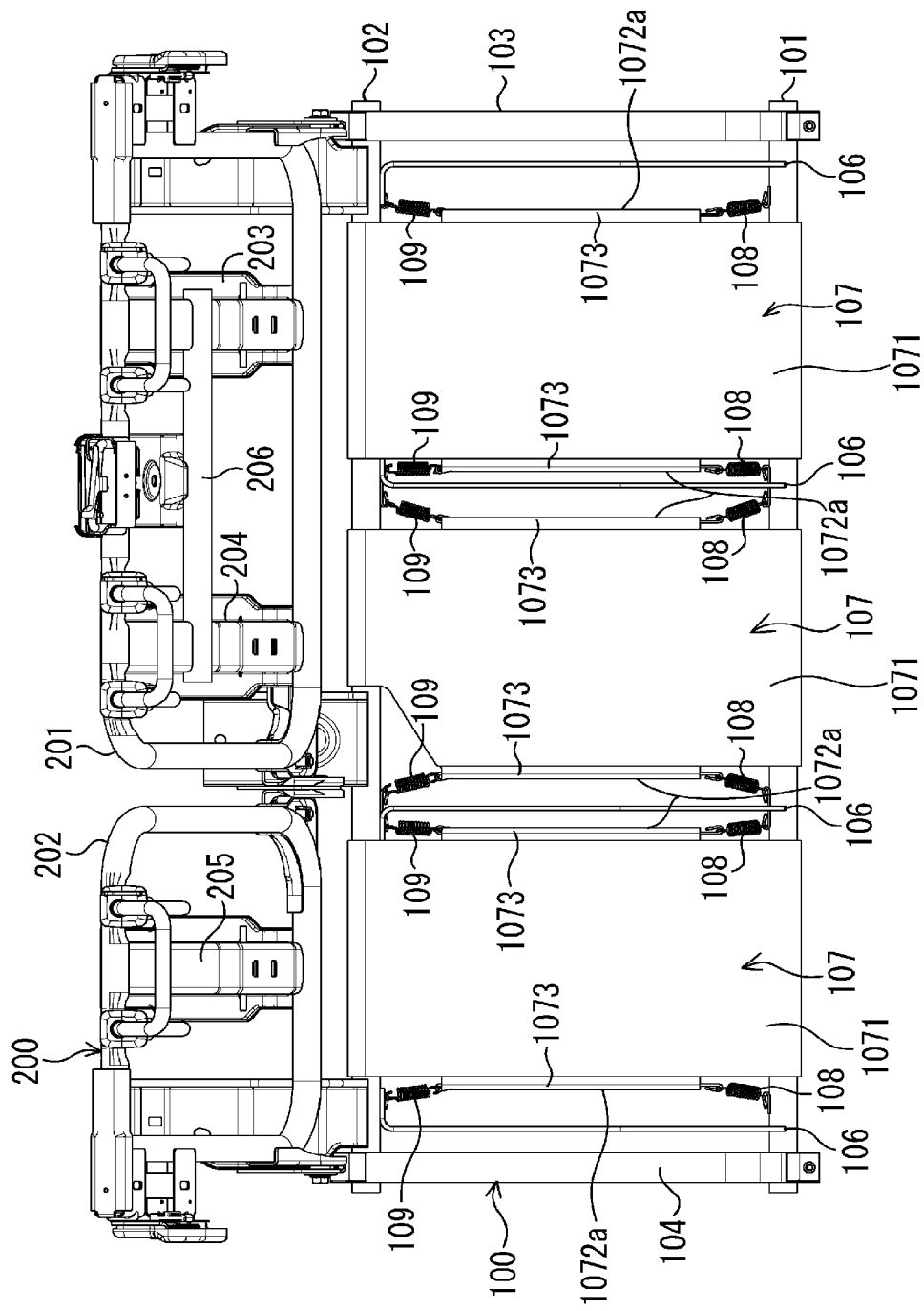
FIG. 3 is a plane view of FIG. 2.

The seat back part 20 is structured such that seat back pads (not illustrated) are supported by the back frame 200 by integrated foam molding or the like and their surfaces are covered with the seat back cover member 220 (refer to FIG. 1). The back frame 200 can have a structure in which, for example, it is divided in the vehicle width direction at a 6:4 ratio and has a first outer frame 201 and a second outer frame 202 which are both formed through the working of pipe materials into a substantially quadrangular shape, as illustrated in FIG. 2 and FIG. 3. The first outer frame 201 has a width equal to the total width of the side seat part 11 and the center seat part 13 of the aforesaid seat cushion part 10, and the second outer frame 202 has a width equivalent to the width of the other side seat part 12.

Lower portions of side frames 201a, 201b of the first outer frame 201 and lower portions of side frames 202a, 202b of the second outer frame 202 are bolt-connected to the middles of the three vehicle body attachment brackets 105 projecting rearward from the rear edge frame 102 of the cushion frame 100.

In the first outer frame 201, trunk support plates 203, 204 are disposed respectively at a position corresponding to the back (in particular, near the center of the back) of a person seated in the side seat part 11 and at a position corresponding to the back (in particular near the center of the back) of a person seated in the center seat part 13, and extend in the up-down direction between an upper frame 201c and a lower frame 201d of the first outer frame 201. In the second outer frame 202, a trunk support plate 205 is disposed at a position corresponding to the back (in particular, near the center of the back) of a person seated in the other side seat part 12 and extends in the up-down direction between an upper frame 202c and a lower frame 202d of the second outer frame 202.

The trunk support plates 203, 204, 205 have a shape whose lower portions bulge more forward than substantially middle portions in terms of the up-down direction, and their middle portions higher than the bulging portions 203a, 204a, 205a, that is, the substantially middle portions in terms of the up-down direction are relatively weak portions. On the other hand, since areas near their end portions connected to the outer frames 201, 202 do not easily deform, the trunk support plates 203, 204, 205 support the backs of the persons during the normal time, and when a large load is applied in such a direction as to push the backs of the persons against the seat back part 20, the whole outer frames 201, 202 incline rearward with the upper sides of the outer frames 201, 202 being displaced rearward. That is, while the function to support the trunk is achieved, the outer frame 201 and the outer frame 202 incline rearward for the purpose of impact absorption. This structure makes it possible to efficiently support a load and absorb an impact even without the whole surfaces of the first outer frame 201 and the second outer frame 202 having a panel form.

The trunk support plates 203, 204, 205 each have a substantially C-shaped (hat-shaped) section. Accordingly, when a load is applied from the rear, in particular, when baggage in a baggage compartment moves forward due to sudden braking and gives a certain load or more, the trunk support plates 203, 204, 205 deform such that their side portions substantially in the C-shape buckle because open surfaces of the sections substantially in the C-shape face rearward. This deformation can absorb impact energy. In addition, if the impact energy has a certain magnitude or more, the trunk support plates 203, 204, 205 deform substantially in a dogleg shape to absorb the impact because the up-down-direction substantially middle portions thereof are relatively weak portions. Therefore, the back frame 200 of this embodiment can efficiently absorb the impact energy applied either from the front or from the rear.

A reinforcing frame 206 extending in the vehicle width direction is weld-fixed to the trunk support plates 203, 204 of the first outer frame 201 at intersection portions on the substantially middle portions in terms of the up and down direction, specifically, on portions slightly higher than the bulging portions 203a, 204a. Consequently, when energy accompanying an impact is applied to the seat back part 20 even at positions deviated from the trunk support plates 203, 204, not to mention the positions corresponding to these trunk support plates 203, 204, the energy passes through the reinforcing frame 206 and can be transmitted and dispersed to the rear edge frame 102 and the vehicle body attachment brackets 105 of the seat cushion frame 100 via the trunk support plates 203, 204 and the first outer frame 201. This can improve strength and durability.

Figure 4:
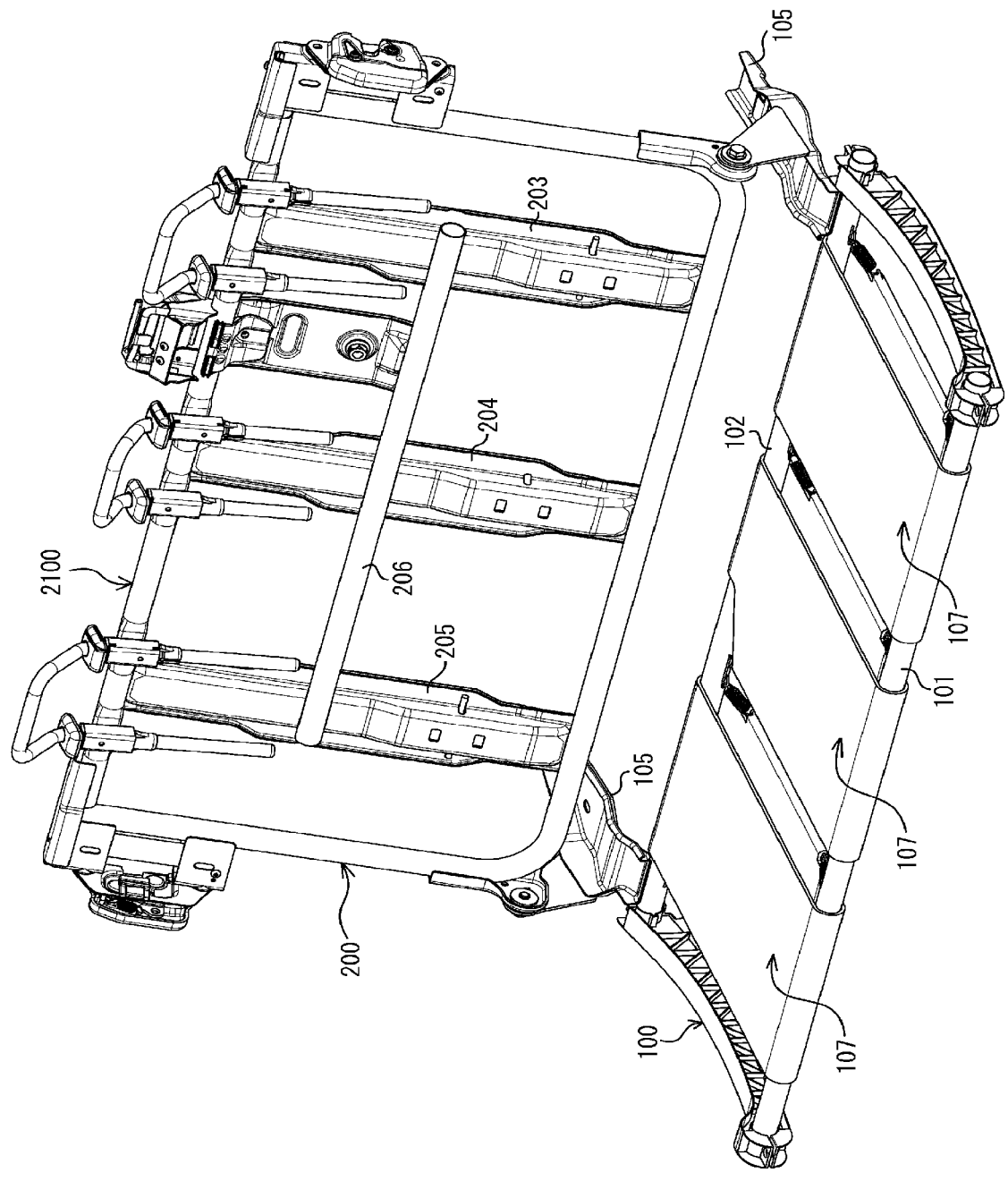
FIG. 4 is an explanatory view of another mode of a back frame.
Figure 5:
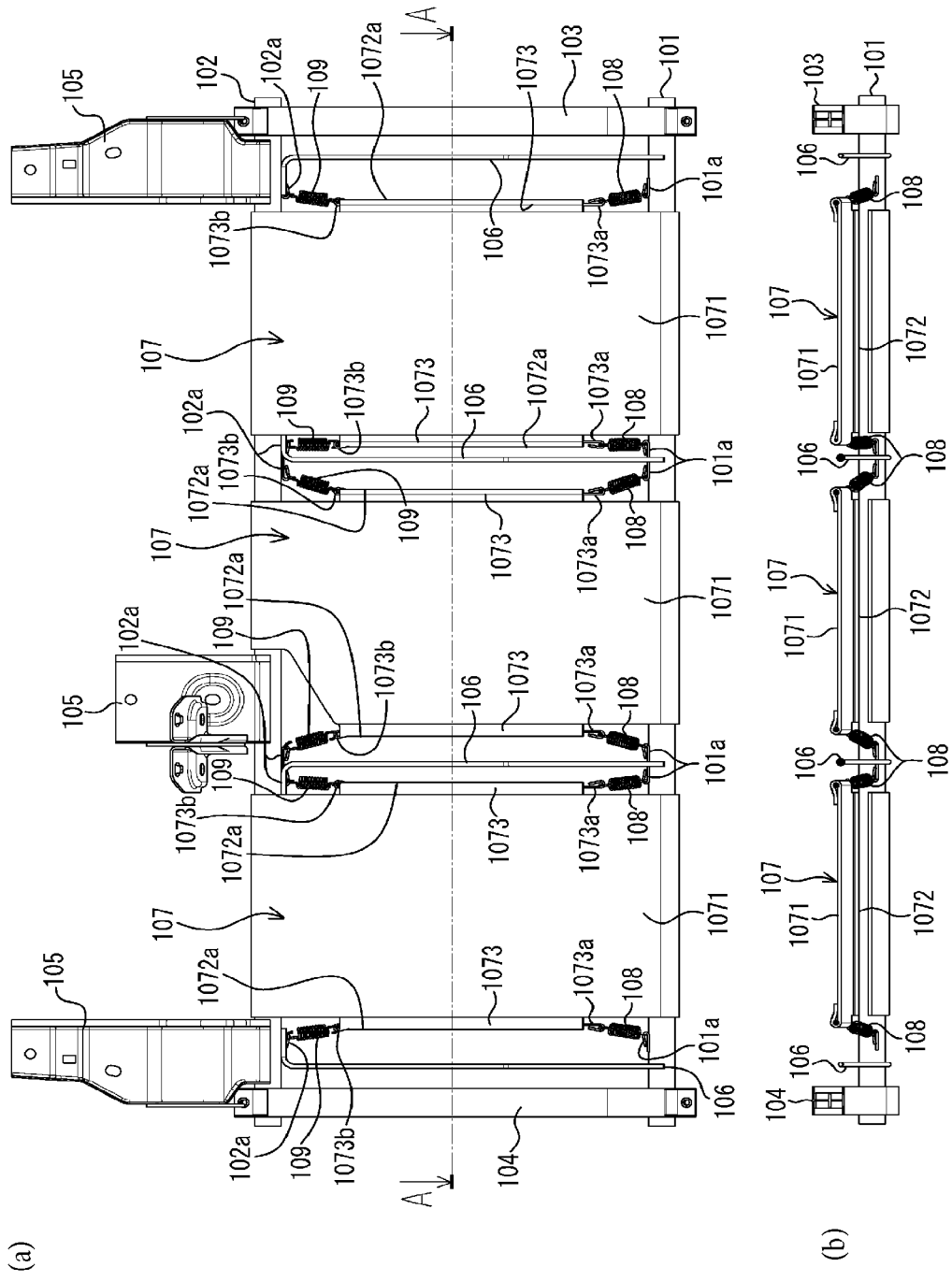
FIG. 5(a) is a plane view of the cushion frame.
FIG. 5(b) is a sectional view taken along the A-A line in FIG. 5(a).
Figure 6:
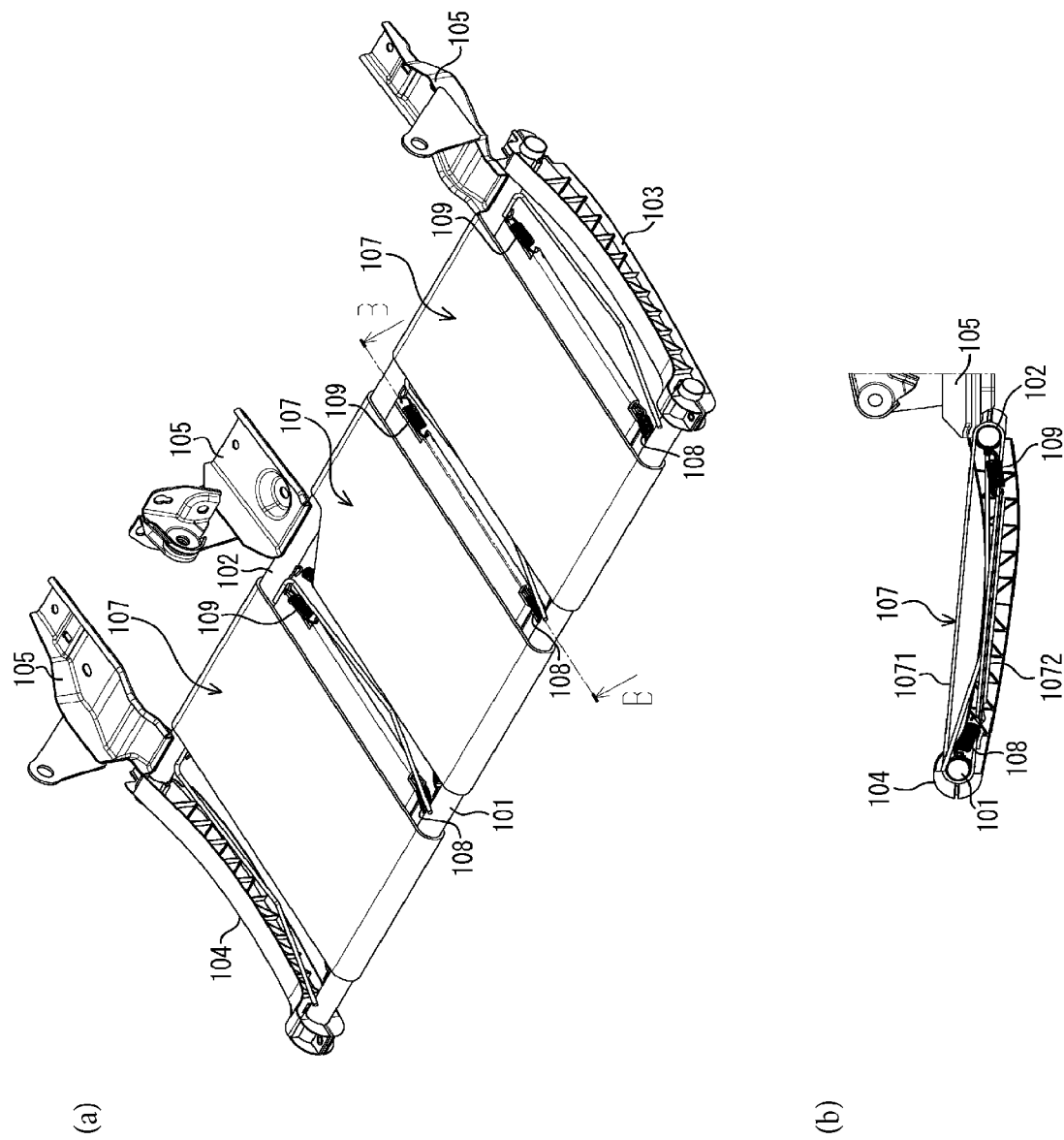
FIG. 6(a) is a perspective view of the cushion frame.
FIG. 6(b) is a sectional view taken along the B-B line in FIG. 6(a).
Figure 7:
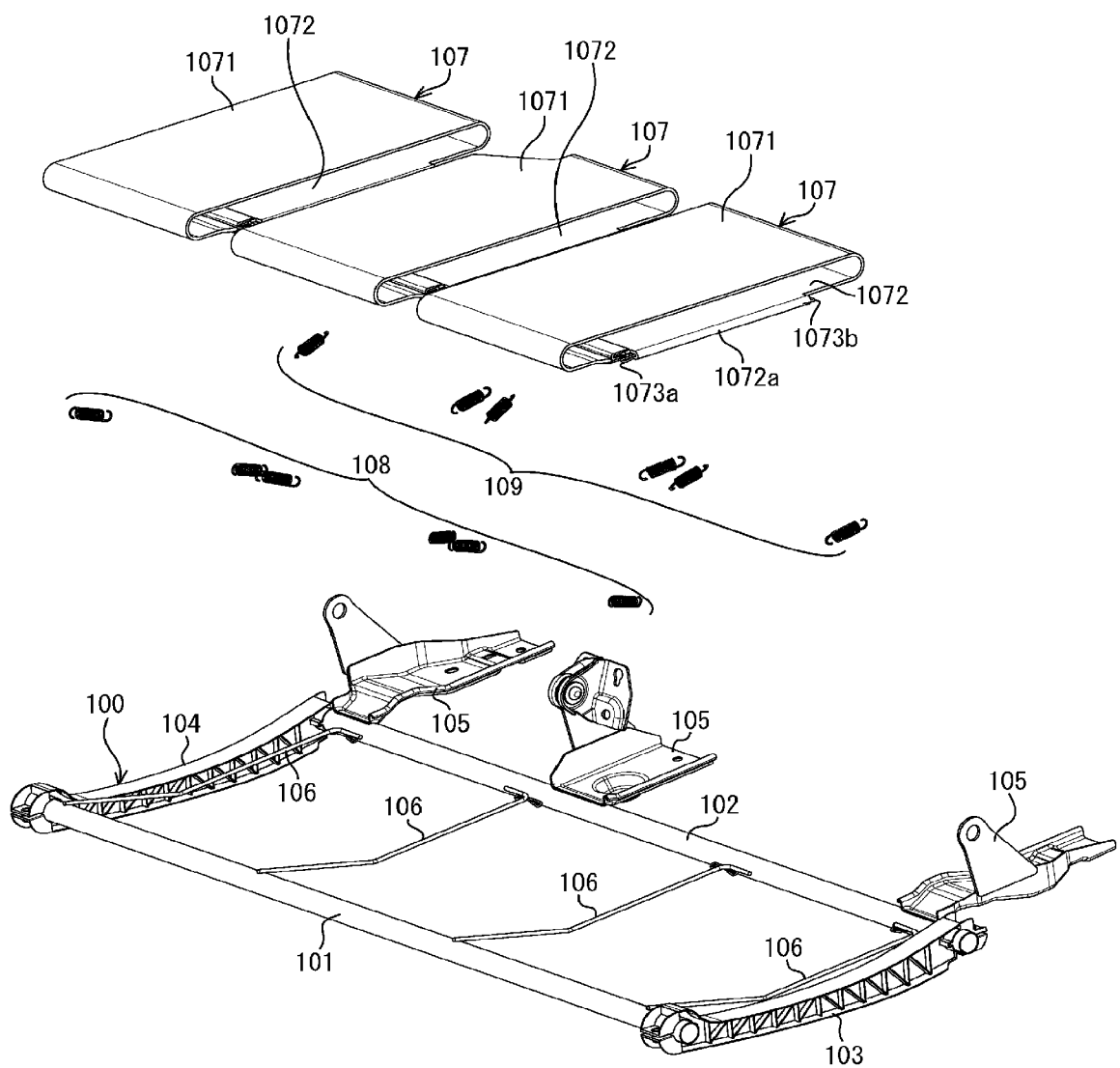
FIG. 7 is an exploded perspective view of the cushion frame.

The back frame 200 may have a structure using an outer frame 2100 formed of one quadrangular frame extending in the vehicle width direction as illustrated in FIG. 4, instead of the divided type illustrated in FIG. 2 and FIG. 3. In this case, since the trunk support plates 203, 204, 205 are provided in the single outer frame 2100, the reinforcing frame 206 is preferably provided so as to intersect with all of these. In this structure, energy applied to the seat back part 20 can be transmitted and dispersed to the outer frame 2100 and to the rear edge frame 102 and the vehicle body attachment brackets 105 of the cushion frame 100, through the reinforcing frame 206 and the three trunk support plates 203, 204, 205. This can also improve strength and durability.

According to this embodiment, when a person is seated, the state illustrated in FIG. 8(a) changes to the state in FIG. 8(b). At this time, the upper layer part 1071 of the base fabric 107 is displaced downward to damp the force. When vibration is further input, the upper layer part 1071 is displaced in the up-down direction as illustrated in FIG. 8(c). The vibration is efficiently eliminated owing to the elastic action of the front and rear coil springs 108, 109 connected in series through the wire members 1073. Further, since the coil springs 108, 109 are connected in series through the wire members 1073, the damping ratio of the base fabric 107 supported by the coil springs 108, 109 is high, and even when large impact energy is applied, high damping force can be exhibited. In addition, owing to the simple structure in which the base fabric 107 is looped and supported by the coil springs 108, 109 via the wire members 1073 provided on the lower layer part 1072, the thickness of a range including these members can be about slightly larger than the diameter of the front edge frame 101 and the rear edge frame 102, and it is possible to exhibit high damping force in spite of the thin structure. Therefore, this structure is preferably used for a rear seat whose lower space is small. However, it is possible to use the structure of this embodiment for a front seat.

EXPLANATION OF REFERENCE SIGNS 1 rear seat
10 seat cushion part
11, 12 side seat part
13 center seat part
100 cushion frame
101 front edge frame
102 rear edge frame
103, 104 side frame
106 wire
107 base fabric
110 seat cushion pad
120 seat cushion cover member
20 seat back part
200 back frame
201 first outer frame
202 second outer frame
203, 204, 205 trunk support plate
220 seat back cover member
2100 outer frame

The invention claimed is:

1. A vehicle seat which includes a seat cushion part and a seat back part, the seat cushion part comprising:
   a cushion frame including a front edge frame and a rear edge frame which are arranged a predetermined interval apart from each other in a front-rear direction and a pair of side frames each disposed between opposed longitudinal-direction end portions of the front edge frame and the rear edge frame;
   a base fabric extending between and looped around the front edge frame and the rear edge frame, and having an upper layer part and a lower layer part which are provided apart from each other in an up-down direction;
   wire members of metal extending in the front-rear direction respectively on side edge portions of the lower layer part of the base fabric; and
   spring members extending between the front edge frame and front end portions of the wire members and between the rear edge frame and rear end portions of the wire members.

2. The vehicle seat according to claim 1, wherein the wire members are hard-drawn steel wires or spring steel wires.

3. The vehicle seat according to claim 1, wherein the spring members are coil springs.

4. The vehicle seat according to claim 1, comprising a vehicle body attachment bracket projecting rearward from the rear edge frame of the cushion frame,
   wherein force acting on the front edge frame is transmitted to the vehicle body attachment bracket through the pair of side frames.

5. The vehicle seat according to claim 4,
   wherein the seat back part includes a back frame coupled by the vehicle body attachment bracket,
   wherein the back frame includes:
      an outer frame in a substantially quadrangular shape;
      a trunk support plate extending in the up-down direction in the outer frame and supporting the back of a seated person; and
      an intersecting frame extending in a vehicle width direction so as to intersect with the trunk support plate and fixed to the trunk support plate at an intersection portion, and
   wherein the trunk support plate and the intersecting frame are transmission paths of force toward the cushion frame.

6. The vehicle seat according to claim 1, the vehicle seat being used as a rear seat.

* * * * *